J. F. ROSE.
TELLURIC GLOBE.

No. 184,546. Patented Nov. 21, 1876.

WITNESSES:
H. Rydquist
John Goethals

INVENTOR:
J. F. Rose
BY
ATTORNEYS.

UNITED STATES PATENT OFFICE.

JOSEPH F. ROSE, OF TIVERTON, RHODE ISLAND.

IMPROVEMENT IN TELLURIC GLOBES.

Specification forming part of Letters Patent No. 184,546, dated November 21, 1876; application filed September 2, 1876.

*To all whom it may concern:*

Figure 1:
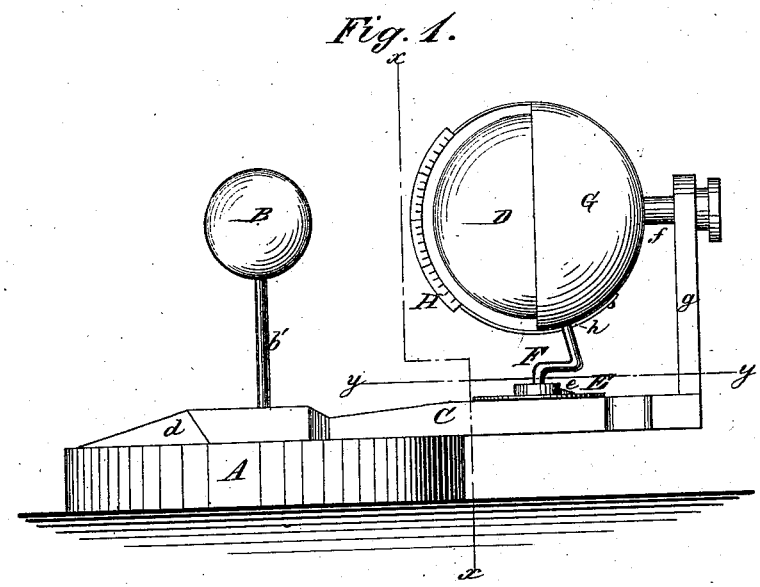
Figure 2:
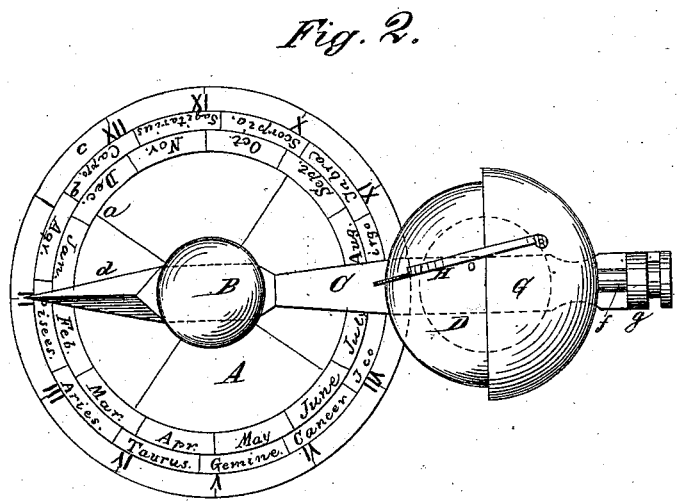
Figure 3:
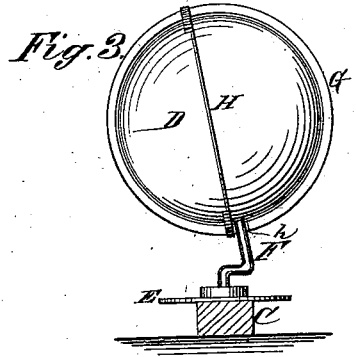
Figure 4:
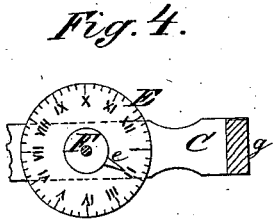

Be it known that I, JOSEPH F. ROSE, of Tiverton, Newport county, State of Rhode Island, have invented a new and Improved Telluric Globe, of which the following is a specification:

In the accompanying drawing, Figure 1 is a side elevation; Fig. 2, a plan view. Fig. 3 is a section on line X X in Fig. 1, and Fig. 4 is a detail view, in section, on line Y Y in Fig. 1, of the dial attached to the globe.

Similar letters of reference indicate corresponding parts.

My invention relates to apparatus for indicating the relative position of the earth and sun at different seasons of the year; and it consists of a circular base-piece, provided with a central post, upon which is supported a ball representing the sun. The circular base-piece is provided with three graduated circles near its outer edge. The inner circle is graduated and marked for the twelve months of the year. The middle circle is graduated and marked for the signs of the zodiac; and the outer circle is graduated into spaces, numbered from one to twelve. It consists, also, of an arm, placed on the central standard of the base-piece, having at one end an index, and at the other a globe, supported on an axis, having a dial graduated to correspond with the outer circle in the base-piece. The axis of said globe is capable of turning, to show its position in relation to the sun at different seasons. It further consists in an envelope representing the dark or night side of the globe; and in a graduated arc, attached to the said envelope, for indicating the sun's altitude.

In the drawing, A is the base-piece, having three concentric circles, a b c, near its outer edge, the circle a being graduated into twelve spaces, representing months. The circle b is graduated into twelve spaces, representing the zodiac, and marked with the twelve signs thereof. The circle c is graduated into twelve spaces, corresponding to the month-spaces in the circle a, and numbered from one to twelve. The space inside these circles is divided by four radial lines, distant from each other ninety degrees, into spaces representing the four seasons of the year. B is a ball, representing the sun, which is supported on a standard, b', that projects upward from the center of the base-piece A. C is an arm, resting on the base-piece A, and turning on the standard b', and formed, at one side, into the index d. The other end projects beyond the base-piece A, and is provided with the dial E, which is graduated in the same manner as the circle c on the base-piece, except that the numbers are oppositely arranged. F is a rod, that forms a vertical axis for the globe and its inclined axis to turn upon. It has a bearing in the center of the dial E, and is provided with the index e. The rod F is offset and bent at an angle, representing the inclination of the earth's axis to the plane of the ecliptic. D is a terrestrial globe, placed on the rod F, which forms its axis. G is a hemispherical envelope, that covers the side of the globe remote from the sun, and is supported on a pivot, f, that runs through a standard, g, fixed to the end of the arm C. A slot, h, is cut in the lower part of the envelope, which embraces the rod F. H is a sectoral scale, that is attached to the envelope G, for indicating the altitude of the sun.

In using the device, the arm C is placed centrally over the month in which it is desired to show the relative position of the earth and sun. The index d then points to a number in the graduated circle c, which is the number against which the index e should be placed on the dial E. The earth will then be represented in its proper position for the month indicated on the circle a.

The envelope G covers the globe, so as to represent the proportion of day and night.

Having thus described my invention, I claim as new and desire to secure by Letters Patent—

1. The graduated base-piece A, arm C, dial E, index e, rod F, and globes D and B, all constructed and arranged for indicating the relative position of the sun and earth at different seasons of the year, substantially as herein shown and described.

2. The combination of the pivoted envelope G, the sectoral scale H, rod F, and globe B, substantially as herein shown and described.

JOSEPH F. ROSE.

Witnesses:
CHAS. A. DURFEE,
EDWARD B. MANCHESTER.